United States Patent [19]

Terasawa et al.

[11] Patent Number: 5,358,218
[45] Date of Patent: Oct. 25, 1994

[54] METHOD OF CONSTRUCTING AN OPTICAL WIRING NETWORK

[75] Inventors: Yoshiaki Terasawa; Hiroaki Sano, both of Kanagawa, Japan

[73] Assignee: Sumitomo Electric Industries, Ltd., Osaka, Japan

[21] Appl. No.: 168,179

[22] Filed: Dec. 17, 1993

Related U.S. Application Data

[63] Continuation of Ser. No. 946,155, Sep. 17, 1992, abandoned, which is a continuation of Ser. No. 674,144, Mar. 25, 1991, abandoned.

[51] Int. Cl.$^5$ .............................................. B66F 3/24
[52] U.S. Cl. .................................................. 254/134.4
[58] Field of Search ................ 254/134.4, 134.3 R, 254/134.3 FT; 184/15.1; 15/104.33; 226/25, 43, 178

[56] References Cited

U.S. PATENT DOCUMENTS

| | | | |
|---|---|---|---|
| 3,120,947 | 2/1964 | Hamrick | 254/134.4 |
| 4,850,569 | 7/1989 | Griffioen et al. | 254/134.4 |
| 4,948,097 | 8/1990 | Reeve et al. | 254/134.4 |
| 4,990,033 | 2/1991 | Handley et al. | 254/134.4 |
| 5,022,634 | 6/1991 | Keeble | 254/134.4 |

*Primary Examiner*—Robert C. Watson
*Attorney, Agent, or Firm*—Cushman, Darby & Cushman

[57] ABSTRACT

In constructing an optical wiring network for connecting optical information processors on a plurality of floors of a building by pressure-feeding an optical fiber cable through a tube using a compressed gas provided by a pressure feeding apparatus, a cable installation route and a pressure of the compressed gas at the entrance end of the tube are first determined so that thrust exerted on the optical fiber cable by the compressed gas is greater, at every point of the route, than resistance including weight of the optical fiber cable in an ascending portion of the route and friction between the optical fiber cable and the tube. After installation of a tube in the building along the determined route, an optical fiber cable is fed through the installed tube with the pressure feeding apparatus, employing the above-determined pressure of the compressed gas at the entrance end.

1 Claim, 6 Drawing Sheets

METHOD OF CONSTRUCTING AN OPTICAL WIRING NETWORK

This is a continuation of application Ser. No. 07/946,155, filed Sep. 17, 1992 now abandoned which is a continuation of Ser. No. 07/674,144, filed Mar. 25, 1991 now abandoned.

BACKGROUND OF THE INVENTION

The present invention relates to a method of constructing an optical wiring network of optical fiber cables for connecting optical information processors on many floors of a building by feeding an optical fiber cable through a tube using a compressed gas provided by a pressure feeding apparatus.

A method of guiding optical fiber cables through tubes with an air stream was developed by British Telecom Research Laboratories, and cable installation by this method is described in an article entitled "The Blown Fiber cable", IEEE Journal on Selected Areas in Communications, Vol. SAC-4, No. 5, August 1986, pp. 679–685. According to the theoretical consideration made in this article, when an optical fiber cable is drawn in a horizontal direction using an air stream, the "effective drag force" per unit length, which is equal to the hydrostatic force due to the simple pressure drop plus the purely viscous component due to the frictional shear force at the surface of the fiber cable, is constant in the longitudinal direction given a constant pressure drop within the tube, and hence the total effective drag force increases in proportion to the installed length of the optical fiber cable. That is, the effective drag force per unit length, f, acting on the optical fiber cable with the air stream is expressed by the following equation:

$$f = \pi r_1 r_2 (dP/dL) \qquad (1)$$

where $r_1$ is an outer radius of the cable, $r_2$ is an inner radius of the tube, and $dP/dL$ is a coefficient representing the gradient of pressure drop within the tube.

In the aforementioned paper, since the gradient of pressure drop within the tube is assumed to be constant along the tube, equation (1) may be rewritten as:

$$f = \pi r_1 r_2 (P_0/L_t) \qquad (2)$$

where $P_0$ is a pressure at the entrance end of the tube, and $L_t$ is a total length of the tube.

If equation (2) holds, the effective drag force per unit length, f, depends on neither the installed length of the optical fiber cable nor the distance from the entrance end of the tube, but is determined by $r_1$, $r_2$, $P_0$ and $L_t$ and remains constant in the longitudinal direction of the optical fiber cable.

If the wiring route contains an ascending portion, the weight of the optical fiber cable drawn into the tube provides a resistance against the drag force by the air stream and the state of the feeding operation is determined by whether the sum of the resistance due to the cable weight and the force of friction between the optical fiber cable and the inner surface of the tube is greater than the drag force. Hence, if $r_1$, $r_2$, $P_0$ and $L_t$ are set at such values that the drag force per unit length, f, is greater than the sum of the resistance and the frictional force, the optical fiber cable can be drawn and installed into the tube over its entire length. In this case, the calculated force per unit length depends on neither the distance of the ascending portion from the entrance end of the tube, nor the installed length of the optical fiber cable into the tube.

In practice, however, the drawing speed of the optical fiber cable decreases as the cable is drawn into the tube over an increased distance and, in an extreme case, the cable may get stuck in the middle of the tube. In this regard, the authors of "The Blown Fiber Cable", supra, stated that the measured values of tension of an optical fiber cable drawn into a tube using an air stream did not agree with those of theoretical considerations, admitting that theoretical considerations do not necessarily reflect the reality.

If the wiring route contains an ascending portion, the profile of drawing speed varies with the distance from the entrance end of the tube and the drag force per unit length of the optical fiber cable would not be uniform along its length. In the case where the tube is provided in a wiring route containing an ascending portion, the optical fiber cable often fails to be effectively drawn and installed into the tube using an air stream.

In order to insure positive drawing of the optical fiber cable, the following practice has been adopted in the prior art: the wiring route is divided into shorter sections (tubes); part of the optical fiber cable is drawn and installed into a divided tube of the route; the remaining part of the cable is rewound at the exit end of that tube; and the remaining part of the cable is drawn into the next tube using an air stream. This method, however, is not highly efficient since cable insertion, installation and rewinding operations have to be repeated for each divided section of the wiring route. Further, an optical fiber cable may have to be spliced at many portions at the sacrifice of its transmission characteristics.

SUMMARY OF THE INVENTION

An object, therefore, of the present invention is to improve the operational efficiency of constructing an optical wiring network.

The above object of the present invention can be achieved by a method of constructing an optical wiring network of optical fiber cables for connecting optical information processors on many floors of a building by pressure-feeding an optical fiber cable through a tube using a compressed gas provided by a pressure feeding apparatus, in which method a wiring route is set in such a way that the thrust exerted on the optical fiber cable by the compressed gas is greater, at every point of the tube, than the resistance created when the optical fiber cable is guided into the tube.

DESCRIPTION OF THE PREFERRED EMBODIMENTS

The critical condition in guiding and installing an optical fiber cable in a tube is determined by two factors, i.e., the thrust (drag force) acting on the optical fiber cable and the resistance consisting of the friction between the inner surface of the tube and the optical fiber cable and the weight of the cable in an ascending portion.

The thrust acting on the optical fiber cable is expressed by equation (1), and it has been found that the pressure in connection with the term dP/dL decreases according to a curve that is convex upward (IEICE Technical Report, Vol. 89, No. 32, pp. 61–66, 1989). Hence, it is theoretically presumed that the closer to the exit end of the tube, the higher the gradient of pressure drop and the greater the thrust per unit length of the optical fiber cable. The thrust is not dependent on the wiring route of the tube, and assumes the same profile unless the inside diameter of the tube or the outside diameter of the optical fiber cable is changed.

The resistance encountered by the optical fiber cable when it is guided through the tube is determined by the weight of the cable and the friction between the cable and the inner surface of the tube. Specific values of the resistance are calculated on an experimental basis.

Figure 8A:
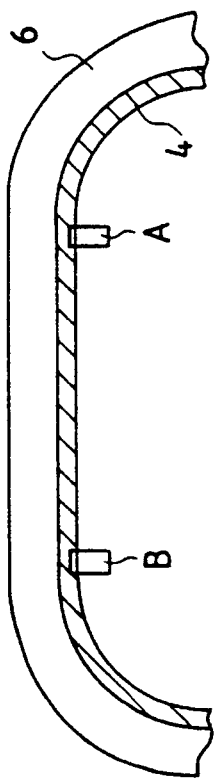
FIGS. 8(a) and 8(b) are diagrams showing the principle of determining frictional force $f\mu$.
Figure 8B:
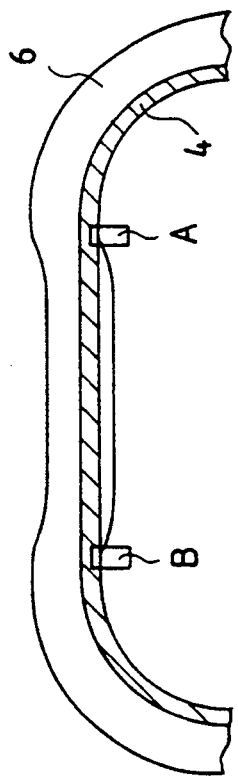

To determine the resistance R, the present inventors constructed wiring routes having various elevational differences and tube lengths as selected from the ranges of 2– 45 m and 100–800 m, respectively, with the inner diameter of the tubes being set at 6 mm$^\phi$, and optical fiber cables having the outer diameter of 2 mm$^\phi$ were guided through the tubes using an air stream. The thrust necessary for guiding each cable was measured with tension meters positioned at various points in the tube. The resistance R is equal to the value of the thrust which can no longer permit the optical fiber cable to be guided through the tube and which is obtained by gradually reducing the thrust. Therefore, the total resistance $F_R$ developing in an ascending portion is calculated by subtracting the tension $f_T$ that develops at the terminal end of the ascending portion when the cable can no longer be guided through the tube from the force, $m + f\mu$, that is the sum of the weight, m, of the cable in the ascending portion and the frictional force $f\mu$ and that acts in the direction opposite to the thrust. In other words, the resistance per unit length R in the ascending portion is expressed by $R = F_R/H = m/H + F\mu/H - f_T/H$, where m/H is the weight of the optical fiber cable per unit length, and $f\mu/H$ is the frictional force per unit length. The value of $f\mu/H$ can be determined by measuring the tension that develops when the optical fiber cable to be guided into a tube in a horizontal route by means of an air stream starts to move for the two cases, one being where the cable is in contact with the inner surface of the tube and the other being where it is not. The principle of the $f\mu/H$ measurement is illustrated in FIGS. 8(a) and 8(b), which are identical to each other in all parameters including the tube diameter, tube length, air pressure and optical fiber cable design, except that the cable between tension meters A and B is in contact with the inner surface of the tube in FIG. 8(a) and it is not in FIG. 8(b). The tension, T, measured with tension meter A is the same in both FIGS. 8(a) and 8(b). If the thrust and frictional forces acting on the optical fiber cable between the tension meters A and B are written as t and $f\mu$, respectively, the tension measured with the meter B is $(T+t-f\mu)$ in FIG. 8(a) and $(T+t)$ in FIG. 8(b). Hence, the difference between the two measured values provides the frictional force $f\mu$. The value of $f_T$ can be directly determined, as described above, by calculating the tension that develops when the cable is guided through the route containing an ascending portion.

Take, for example, the case where the weight of the cable is 2 g/m and the wiring route contains a vertical ascending portion having a length of H m. Since $f\mu/H = 0.34$ (g/m) and $(m - f_T)/H = 0.055$ H, the resistance R is expressed by:

$$\begin{cases} R = 0.055H + 0.34 \text{ [g/m]} & (0 < H < 36.3) \\ R = 2.34 \text{ [g/m]} & (H \geq 36.3). \end{cases} \quad (3)$$

Equation (3) shows that the resistance per unit length increases with the length of the ascending portion of the wiring route, probably because of the decrease of the relative effect of the thrust from the part preceding the ascending portion.

Theoretically, the resistance R cannot exceed 2.34 g/m which is the sum of the weight of the cable and the frictional force acting on it, therefore R is constant for H not less than 36.3 m.

Consequently, the optical fiber can be guided through a tube without stopping in the middle of the tube by comparing the values of various parameters discussed above and by setting the wiring route in such a way that the thrust will exceed the resistance at every point of the tube.

The methods of constructing an optical wiring network according to various embodiments of the present invention will be described below with reference to FIGS. 1–7, in which like components are identified by like numerals or symbols to avoid redundancy.

Figure 5:
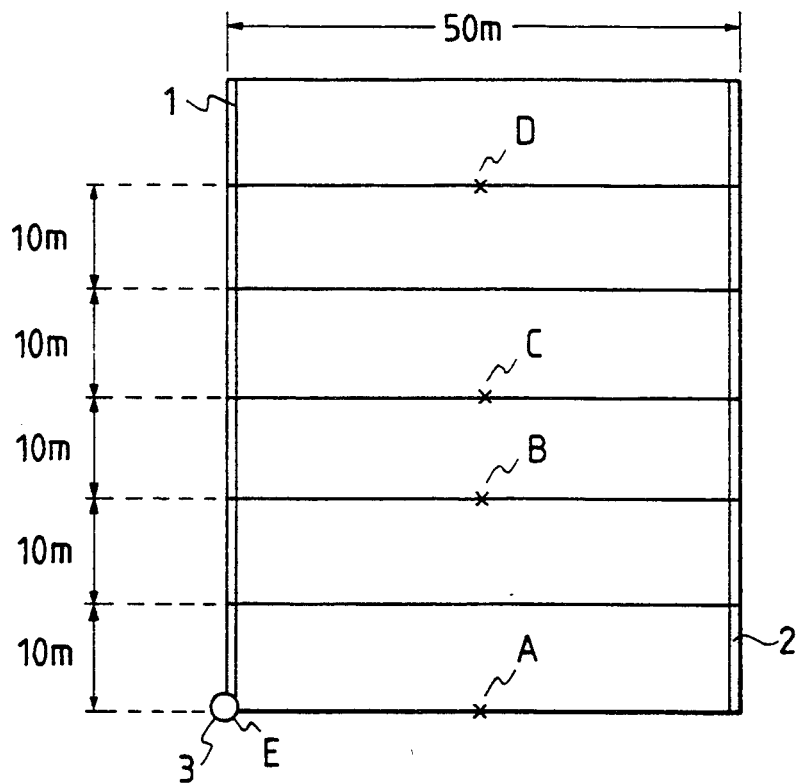
FIG. 5 is a schematic diagram showing a layout of optical information processors to be interconnected with an optical fiber cable.
Figure 6:
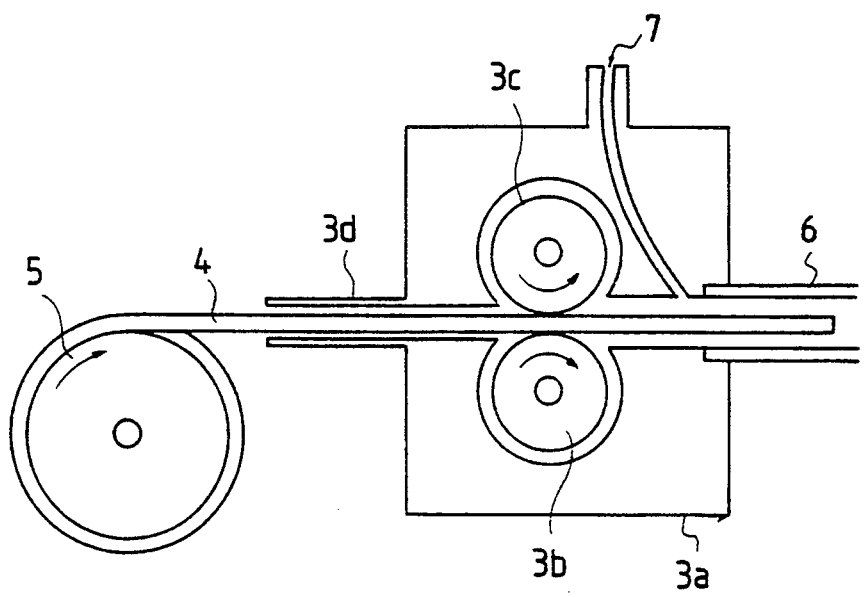
FIG. 6 is a vertical section showing an example of the construction of a pressure feeding apparatus that can be used in the embodiments and application examples of the present invention to supply compressed air for forcing an optical cable under pressure.
Figure 7:
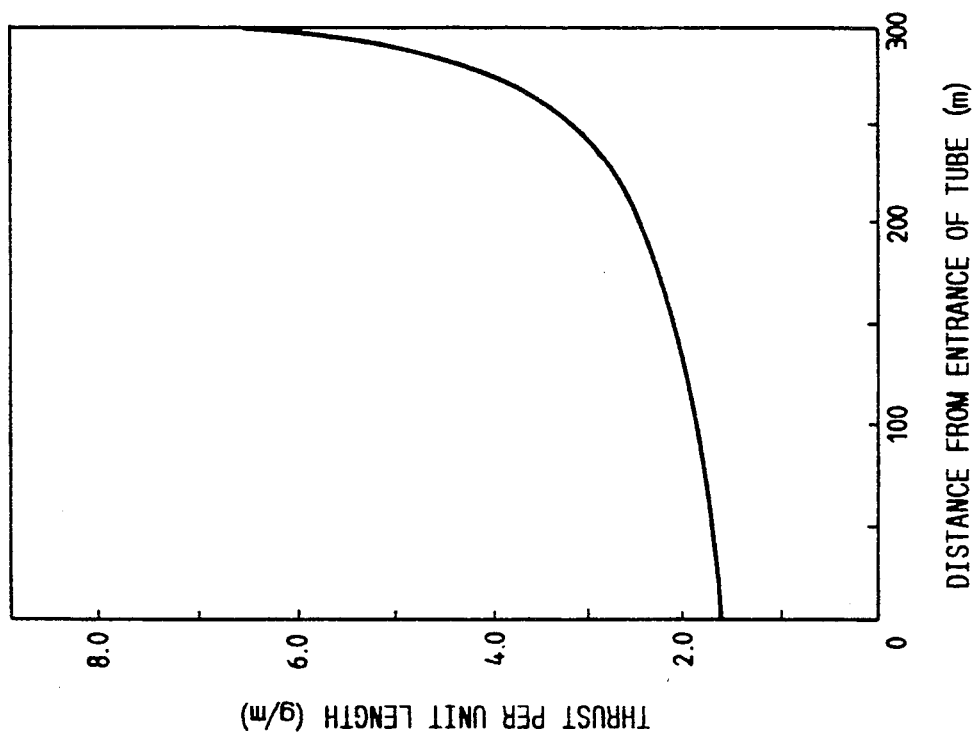
FIG. 7 is a graph showing thrust per unit length of an optical fiber cable, with compressed air being supplied from the apparatus shown in FIG. 6.

FIGS. 1–4 show embodiments and application examples of the present invention. FIG. 5 shows an example of a layout of optical information processors. FIG. 6 shows an example of a pressure feeding apparatus that supplies compressed air for drawing an optical fiber cable into a tube. FIG. 7 is a graph showing thrust per unit length that is provided by compressed air supplied from the pressure feeding apparatus.

First, the characteristics of the pressure feeding apparatus are described with reference to FIGS. 6 and 7 for the layout of optical information processors shown in FIG. 5. As shown in FIG. 5, optical information processors A–D are installed on respective four floors of a six-storied building. Ducts 1 and 2 are furnished on two sides of the building, that extend vertically as spaced apart by a distance of 50 m in a horizontal direction. The height of each story as measured to the floor of the next story lying above it is 10 m. The operation of cable installation in this building starts at a point E which is located in the lowest position of the duct 1. A pressure feeding apparatus 3 for supplying compressed air to draw an optical fiber cable under is connected to the point E.

An example of the pressure feeding apparatus 3 is shown in FIG. 6, which has an inlet 7 for compressed air and drive wheels 3b and 3c encased in a feed head 3a. In this regard, reference is made to Japanese Patent Application Unexamined Publication No. Sho. 59-104607 and "The Blown Fiber Cable" already mentioned above. The optical fiber cable 4 to be drawn by means of the pressure feeding apparatus 3 is unwound from a supply reel 5, guided into the head 3a by means of the drive wheels 3b and 3c in the form of rubber rollers through a cable inlet 3d by a force just strong enough to overcome the hydrostatic potential, and is thereafter drawn into a tube 6.

FIG. 7 is a graph showing the profile of thrust per unit length that develops when the optical fiber cable 4 having an outer diameter of 2 mm is guided into the tube 6 having an inner diameter of 6 mm over its entire length of 300 m, with a gauge pressure of 8 kg/cm$^2$ being applied at the entrance end of the tube 6. The curve showing the thrust profile (which is hereunder referred to as a "thrust line") is specified by the outer diameter of the optical fiber cable 4, the inner diameter of the tube 6, its overall length, and the pressure of the compressed gas supplied into the tube 6 (i.e., the pressure at the entrance end of the tube 6). As shown by FIG. 7, the thrust per unit length of the optical fiber cable 4 increases along a quadratic curve with the distance from the entrance end of the tube 6.

Figure 1B:
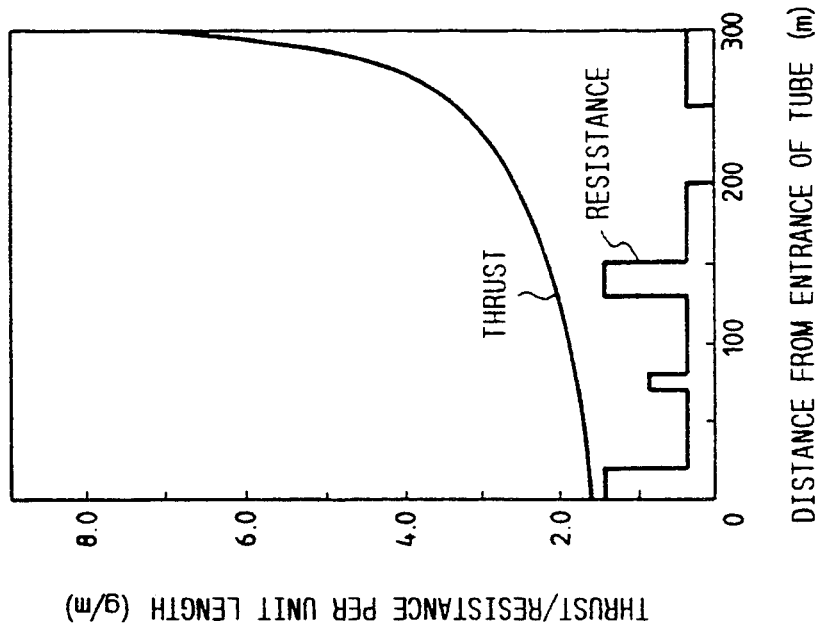
FIGS. 1(*a*) and 1(*b*) illustrate how an optical wiring network is constructed according to an embodiment of the present invention.
Figure 1A:
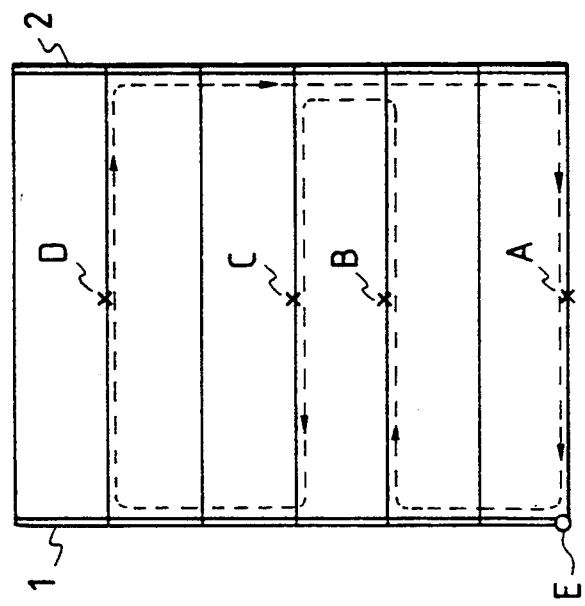

FIG. 1 shows a method of constructing an optical wiring network according to an embodiment of the present invention. The method starts with forcing the optical fiber cable to be guided from the point E to the third floor through the duct 1. As shown in FIG. 1(b), the resistance developing in the ascending portion from the first to the third floor is smaller than the thrust created by the compressed air. However, the resistance will exceed the thrust if it is attempted to force the cable up to the fourth floor. Obviously, the optical fiber cable can positively be installed if it is connected to the optical information processor B on the third floor. Subsequently, the cable is forced through the duct 2 from the third to the fourth floor. In this case, the resistance is much smaller than the thrust, so that the optical fiber cable can be fed at a higher speed. On the fourth floor, the cable is connected to the optical information processor C. In the next step, the cable is forced from the fourth to the sixth floor through the duct 1 and connected to the optical information processor D on the sixth floor. While the resistance developing during the feed of the cable from the fourth to the sixth floor is equal to the resistance during the feed from the first to the third floor, the thrust during the former feed is much greater than the resistance by virtue of the thrust's increase rate along a quadratic curve, thereby permitting the cable to be fed at a higher speed. After being connected to the optical information processor D on the sixth floor, the cable is forced down to the first floor through the duct 2 and connected to the optical information processor A.

As described above, if the thrust line is preliminarily determined, the optical fiber cable can be fed and installed in a positive way by setting the wiring route in such a way that the resistance is smaller than said thrust line at every point of the wiring route.

Figure 2B:
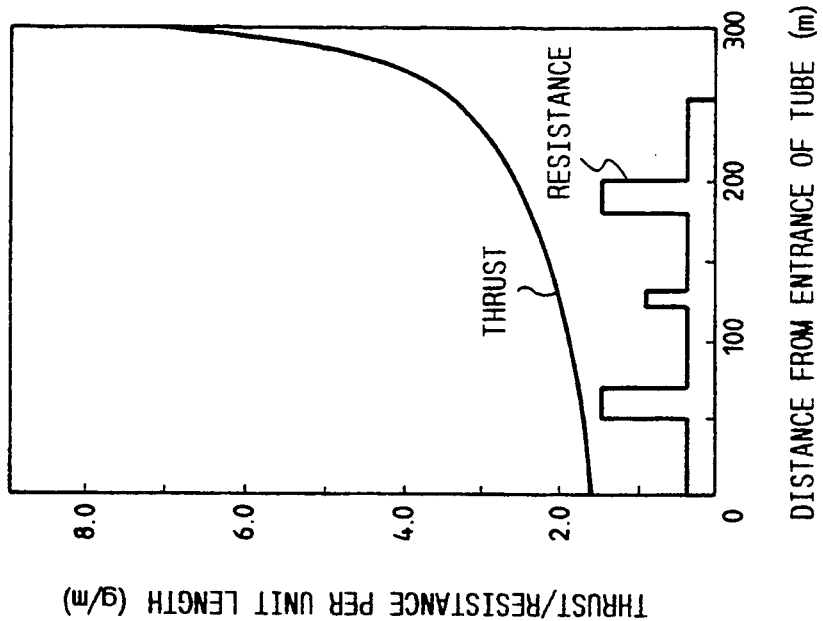
FIGS. 2(*a*) and 2(*b*) illustrate how an optical wiring network is constructed according to another embodiment of the present invention.
Figure 2A:
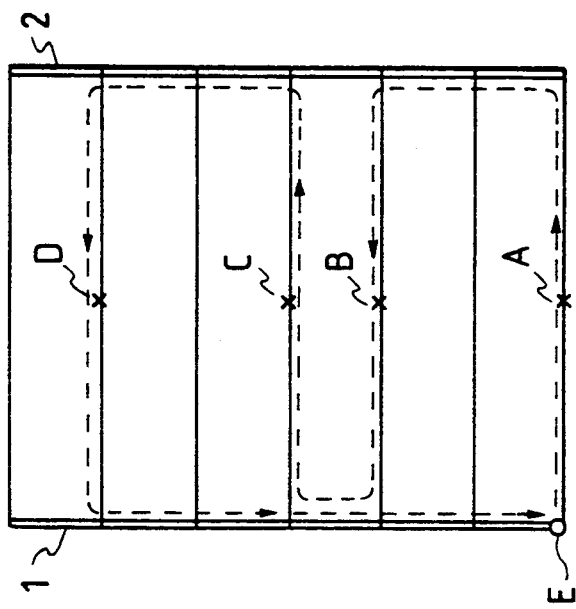

FIG. 2 shows a method of constructing an optical wiring network according to another embodiment of the present invention. The method starts with feeding the optical fiber cable from the point E to the duct 2, through which it is forced up to the third floor. In this case, as shown by FIG. 2(b), the resistance developing when the cable is forced from the first to the third floor is smaller than the thrust created by compressed air, and therefore the cable can positively be forced to the third floor, where it is connected to the optical information processor B. Thereafter, the cable is forced to the fourth floor through the duct 1. On the fourth floor, the cable is connected to the optical information processor C, and thence forced up to the sixth floor through the duct 2. While the resistance developing during the feed of the cable from the fourth to the sixth floor is equal to the resistance during the feed from the first to the third floor, the thrust during the former feed is much greater than the resistance by virtue of the thrust's increase rate along a quadratic curve, thereby permitting the cable to be forced at a higher speed. After being connected to the optical information processor D on the sixth floor, the optical fiber cable is forced down to the first floor through the duct 1 and returns to the starting point E.

In the second embodiment described above, the first ascending portion is provided at the point farther from the entrance end of the tube than the first embodiment shown in FIG. 1, so that the difference between the thrust and the resistance can be made sufficiently great to permit the optical fiber cable to be forced from the first to the third floor at a faster speed.

Figure 3B:
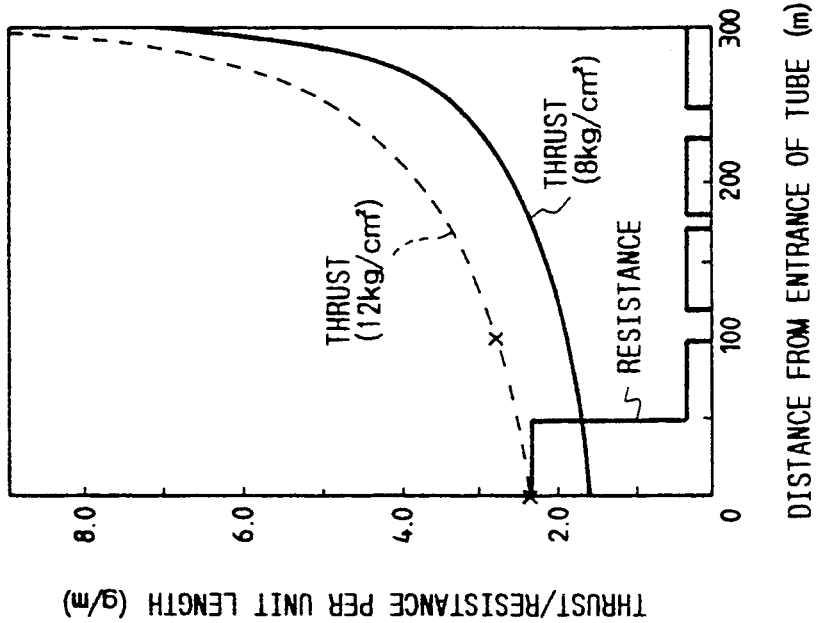
FIGS. 3(*a*) and 3(*b*) illustrate how an optical wiring network is constructed according an application example of the present invention.
Figure 3A:
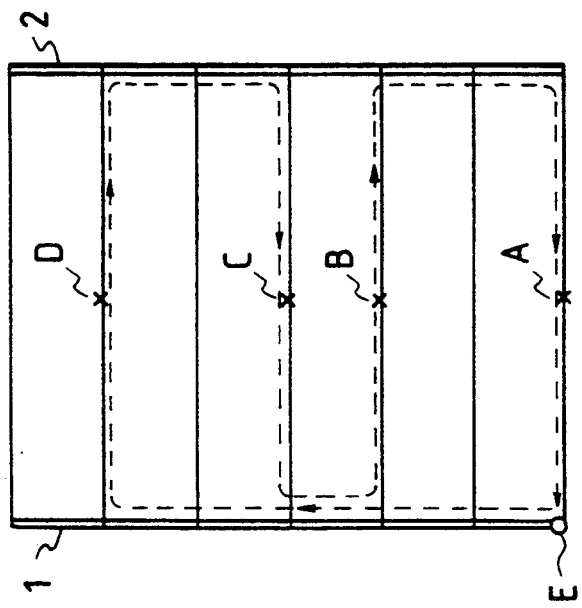

FIG. 3 shows an application example of the method of constructing an optical fiber cable according to the present invention, in which the cable is forced through the duct 1 to climb from the point E straight to the sixth floor. If, in this case, the compressed air used provides a gauge pressure of only 8 kg/cm$^2$ at the entrance end of the tube (see FIG. 7), the resistance exceeds the thrust line (indicated by a solid line in FIG. 3(b),) and the optical fiber cable cannot be forced up to the sixth floor. If, on the other hand, compressed air is used that is capable of providing a gauge pressure of, e.g., 12 kg/cm$^2$, the thrust line (indicated by a dashed line in FIG. 3(b)) becomes greater than the resistance, and is sufficient for the cable to be forced to the sixth floor. In this example, the cable is first connected to the optical information processor D.

Figure 4B:
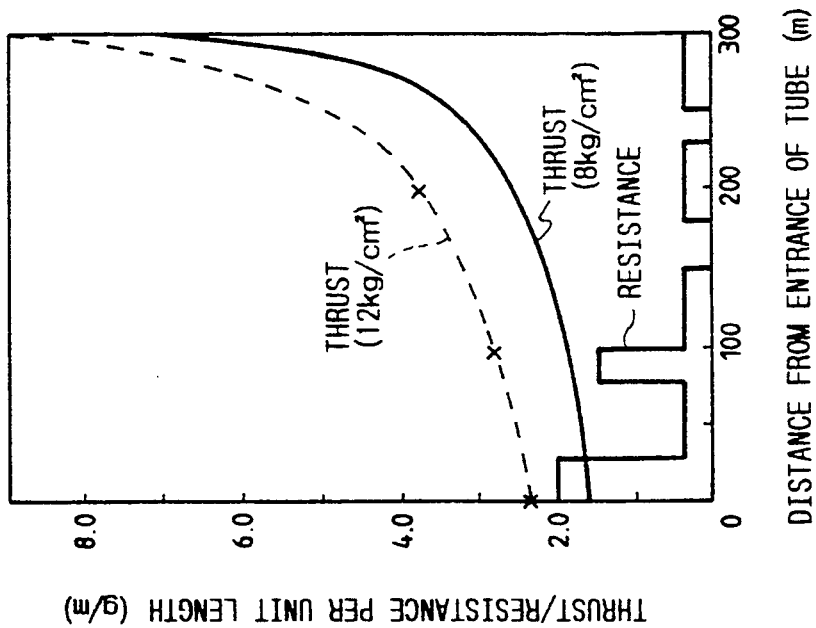
FIGS. 4(*a*) and 4(*b*) illustrate how an optical wiring network is constructed according to another application example of the present invention.
Figure 4A:
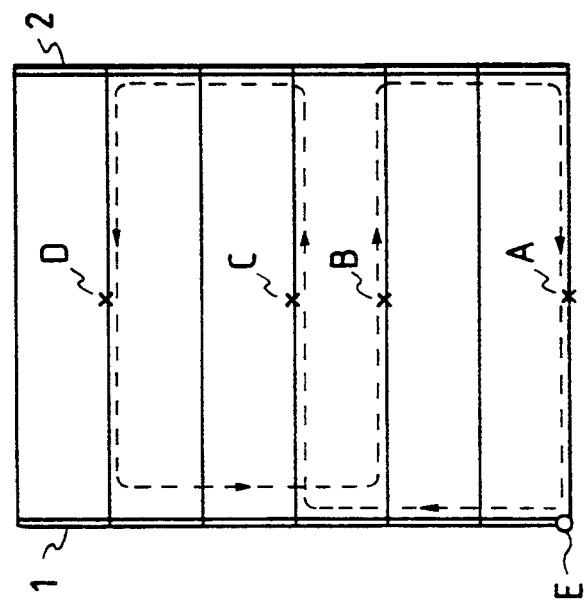

FIG. 4 shows another application example of the method of constructing an optical wiring network according to the present invention, in which the cable is forced through the duct 1 to climb from the point E to the fourth floor, where it is connected to the optical information processor C. If, in this case, the compressed air used provides a gauge pressure of only 8 kg/cm$^2$ at the entrance end of the tube (see FIG. 7), the resistance exceeds the thrust line (indicated by a solid line in FIG. 4(b)), and the optical fiber cable cannot be forced up to the force floor. However, if compressed air is used that is capable of providing a gauge pressure of, e.g., 12 kg/cm$^2$, the thrust line (indicated by a dashed line in FIG. 4(b)) becomes greater than the resistance, and is sufficient for the cable to be forced to the fourth floor. In the second application example, the difference between the thrust line and the resistance is greater than in the first application example, whereby the optical fiber cable can be forced at a higher speed.

As described on the foregoing pages, an optical fiber cable can positively be forced to desired floors of a many-storied building either by setting a tube wiring network in such a way that the resistance at every point in the tube is smaller than the thrust line determined by the pressure of compressed air, or by applying a thrust line that exceeds the resistance at every point of the tube.

While the two embodiments and two application examples of the present invention have been described above, it should be noted that they are by no means intended to limit the scope of the present invention, and that the parameters such as the starting point of cable installation, the route of installation, the number of floors in a building where a cable is to be installed, and the number of optical information processors to be connected by the optical fiber cable may be varied in any desired way. For example, more than one optical information processor may be provided on the same floor, or the optical fiber cable need not be finally returned to the initial point of cable installation.

The compressed gas to be used also is not limited to compressed air and may be replaced by an inert gas.

Further, the cross section of the tube and the optical fiber cable is not limited to a circle, but other shapes may be adopted. What is critical to the present invention is that the wiring route of the optical fiber cable should be set in such a way that the level of the resistance developing along a route will not exceed the thrust of the cable at any point of the route.

Having the features described above, the method of the present invention enables an optical fiber cable to be forced positively to desired floors of a many-storied building, thereby improving the operational efficiency in constructing an optical wiring network.

What is claimed is:

1. A method of constructing an optical wiring network along a cable installation route which includes a plurality of sections each having different heights, comprising the steps of:

determining at every point of a hypothetical route a viscous drag force to be exerted on an optical fiber cable when it is blown through a tube section by use of a pressure feeding apparatus that provides a prescribed pressure, a friction between the optical fiber cable and the tube section, and a weight of cable;

calculating a total resistance at every point of the hypothetical route based on the determined friction and weight;

determining locations of tube sections so that the total resistance does not exceed the viscous drag force at every point and thereby determining a cable installation route;

installing along the cable installation route a tube network comprising a plurality of tube sections and an entrance end; and blowing the optical fiber cable through the tube network by use of the pressure feeding apparatus disposed at the entrance end of the tube network so as to install at one continuous time the optical fiber cable.

* * * * *